United States Patent [19]

Willcox et al.

[11] 4,173,597

[45] Nov. 6, 1979

[54] IMPACT STYRENE POLYMER BLENDS WITH THERMOPLASTIC ELASTOMERS

[75] Inventors: Kenneth W. Willcox; Fay W. Bailey, both of Bartlesville, Okla.

[73] Assignee: Phillips Petroleum Company, Bartlesville, Okla.

[21] Appl. No.: 871,659

[22] Filed: Jan. 23, 1978

[51] Int. Cl.$^2$ ............................................. C08L 53/00
[52] U.S. Cl. ................................................... 525/98
[58] Field of Search .................................. 260/876 B

[56] References Cited

U.S. PATENT DOCUMENTS 3,637,554  1/1972  Childers ........................ 260/876 B Primary Examiner—J. Ziegler

[57] ABSTRACT

A blend comprising (1) a styrene polymer and (2) thermoplastic elastomer of a monovinyl-substituted aromatic compound and a conjugated diene having a melt flow within the range of 2–15, said blend having a diene content within the range of 18–24 weight percent. Such blends have outstanding toughness.

10 Claims, 2 Drawing Figures

IMPACT STYRENE POLYMER BLENDS WITH THERMOPLASTIC ELASTOMERS

BACKGROUND OF THE INVENTION

This invention relates to impact styrene polymer blends.

It is well known to blend rubber with styrene polymers to improve the impact strength of the styrene polymer. However, the use of rubber in styrene polymers tends to adversely affect other properties such as clarity. Consequently, the improvement in impact strength for styrene polymers has heretofore involved a compromise between progressively greater impact strength as the diene content of the blend increases and progressively deteriorating properties in other respects.

SUMMARY OF THE INVENTION

It is an object of this invention to provide a styrene polymer composition having a disproportionately high impact value for the percentage of polymerized diene present in the overall blend;

It is a further object of this invention to provide a method of producing impact resistant styrene polymer compositions having greatly improved impact strength without serious deterioration in other properties such as hardness.

In accordance with this invention, there is provided a blend comprising a styrene polymer and a thermoplastic elastomer having a melt flow within the range of 2–15, said blend having total polymerized diene content within the range of 18–24 weight percent.

BRIEF DESCRIPTION OF THE DRAWINGS

In the drawings, forming a part hereof.

DESCRIPTION OF THE PREFERRED EMBODIMENTS

Figure 1:
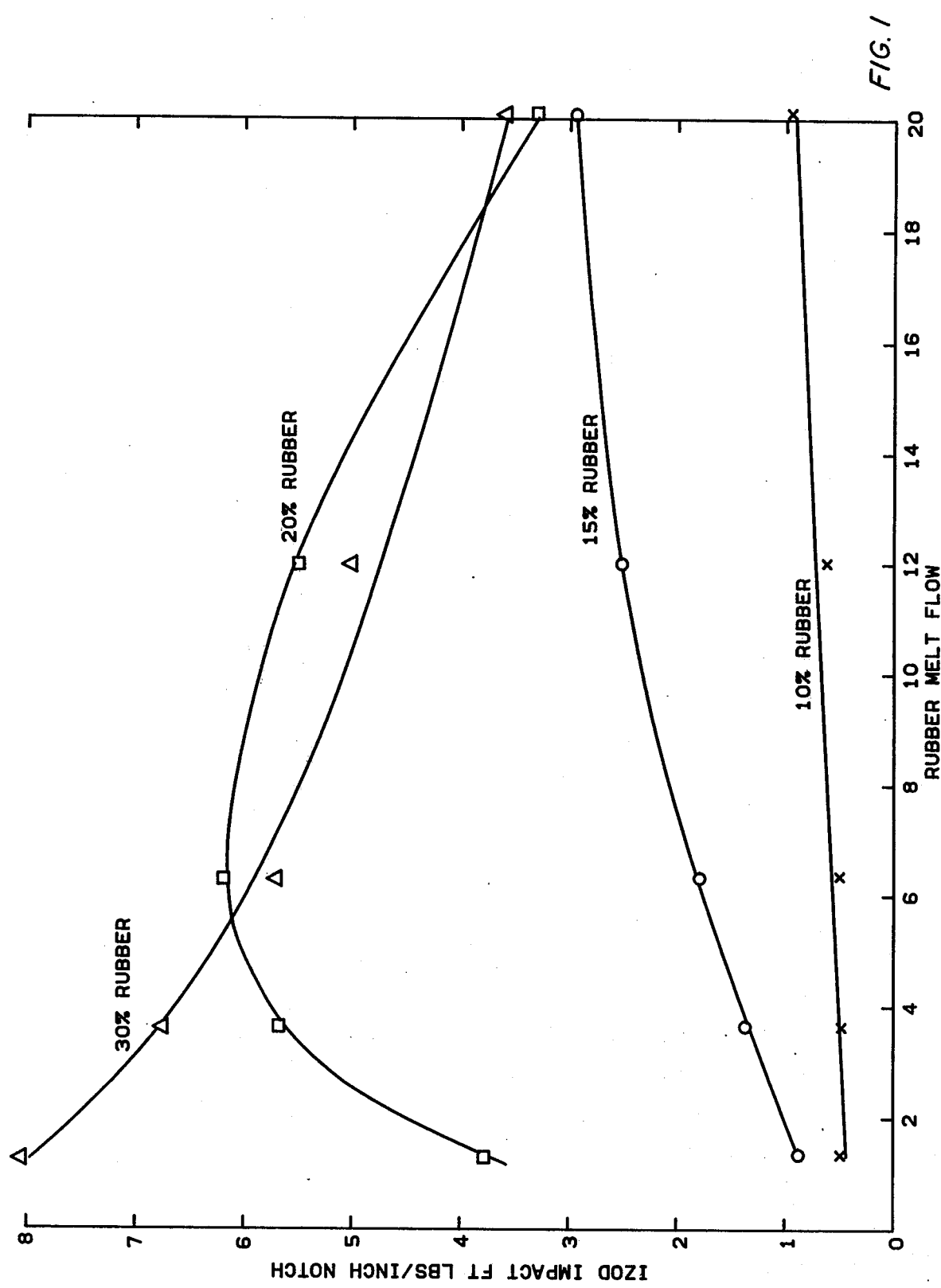
FIG. 1 shows the relationship between impact strength and melt flow for linear block 70/30 butadiene/styrene-polystyrene blends and FIG. 2 shows a similar relationship for a radial thermoplastic elastomer-polystyrene blends at various total diene contents.

The styrene polymers suitable for use in the blends of this invention are those commercially available, resinous, general purpose polymers which normally consist essentially of polymerized styrene. A styrene homopolymer generally referred to as crystal polystyrene is preferred. However, a styrene polymer can be employed which can contain from about 5–10 weight percent (total) of one or more other copolymerizable ethylenically unsaturated compounds such as alpha-methylstyrene, acrylonitrile, methylacrylate, and the like. These comonomers and the polymerization thereof are described in more detail in U.S. Pat. No. 3,907,931, issued to Durst on Sept. 23, 1975, the disclosure of which is hereby incorporated by reference.

The impact modifier of this invention is a thermoplastic elastomer. By thermoplastic elastomer is meant a polymer, generally a hydrocarbon polymer, which exhibits elastic properties in the solid state without the use of chemical crosslinking agents and yet can be remelted. By "hydrocarbon" polymer is meant a polymer of monomers consisting essentially of carbon and hydrogen, i.e., without substituents such as halogens and the like. The thermoplastic elastomers exhibit the characteristics of being elastomeric and still being susceptible to being remelted by virtue of having at least two terminal resinous blocks and a central diene block.

These polymers can be what is broadly referred to as ABA polymers, that is, polymers having a linear structure produced by sequential polymerization of the A segment (monovinyl-substituted aromatic compound) followed by the B segment (conjugated diene) followed by the other A segment.

Alternatively, the thermoplastic elastomer can be depicted by the formula $(AB)_nY$ wherein A and B are as described above, n is a number of at least 2, preferably 2–4 and Y is the residue of a polyfunctional initiator or a polyfunctional coupling agent.

When Y is a residue of polyfunctional coupling agent, it is derived from treating agents containing from 2 to 4 functional groups per molecule. Useful polyfunctional coupling agents include multiepoxides, multiimines, multiisocyanates, multialdehydes, multiketones, multiesters, multianhydrides and multihalides. Specific examples of such agents include benzene-1,4-diisocyanate, naphthalene-1,2,5,7-tetraisocyanate, tri(1-aziridinyl)-phosphine oxide, epoxidized soybean oil, epoxidized linseed oil, 1,4,7-naphthalene tricarboxaldehyde, 1,4,9,10-anthracenetetrone, pyromellitic dianhydride, trimethyl tricarballylate, dichlorodimethylsilane and silicon tetrachloride.

When Y is a residue of a polyfunctional initiator it is derived from compounds of general formula $R(Li)_x$ where x is an integer of from 2 to 4 and R is an aliphatic, cycloaliphatic or aromatic radical containing from 1 to 20 carbon atoms. Specific examples of useful polyfunctional initiators include dilithiomethane, 1,4-dilithiobutane, 1,20-dilithioeicosane, 1,2-dilithio-1,2-diphenylethane, 1,4-dilithiocyclohexane, 1,3,5-trilithiopentane, 1,2,5-trilithio-naphthalene, 1,3,5,8-tetralithiodecane and 1,2,3,5-tetralithiocyclohexane.

While a distinction has been made herein between ABA polymers made by sequential monomer addition and $(AB)_nY$ polymers which would be linear when n is 2, (and radial when n is greater than 2), the art sometimes makes no such distinction since the physical properties are generally essentially identical for both ABA and $(AB)_2Y$ polymers.

Obviously, the diene portion causes the thermoplastic elastomer to have elastomeric properties. The terminal resinous blocks apparently form crystal structures which serve the same function as chemical crosslinking to give rubbery material having the strength characteristics normally associated with cured rubber. However, on heating the crystal structures melt as with other thermoplastic materials. The production of such polymers is broadly disclosed in Hsieh, U.S. Pat. No. 3,639,521 (Feb. 1, 1972), the disclosure of which is hereby incorporated by reference, it being understood that the particular thermoplastic elastomers for use in this invention are those which preferably have a ratio of polymerized conjugated diene/polymerized monovinyl-substituted aromatic compound within the range of 60/40 to 75/25, most preferably a ratio of about 70/30.

Because of the presence of at least two terminal resinous blocks, the thermoplastic elastomers are also sometimes referred to as teleblock rubbers or teleblock copolymers.

Suitable conjugated dienes or mixtures thereof that can be used in the preparation of the thermoplastic elastomer include those having 4 to 12 carbon atoms per molecule, those containing 4 to 8 carbon atoms being preferred. Exemplary of suitable compounds are 1,3-butadiene, isoprene, 2,3-dimethyl-1,3-butadiene, piperylene, 3-butyl-1,3-octadiene, and the like. The preferred dienes are 1,3-butadiene and isoprene, most preferably 1,3-butadiene.

Suitable monovinyl-substituted aromatic compounds for use in the thermoplastic elastomer impact modifier are those containing from 8 to 18 carbon atoms per molecule. Examples of suitable compounds include styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl)-styrene, 1-vinylnaphthalene, 2-vinylnaphthalene, and the like, and mixtures thereof. Styrene is the preferred monovinyl-substituted aromatic compound.

The impact modifier must have a melt flow within the range of about 2–15 at 180° C. in accordance with ASTM D 1238-65T with a 5 kg weight. The impact modifier is employed in an amount so that the final blend contains from 18–24, preferably about 20 weight percent polymerized diene based on the total weight of thermoplastic elastomer and styrene polymer.

The amount of thermoplastic elastomer in the blend is, of course, restricted to rather narrow limits because of the requirement that the overall blend contains an amount of polymerized diene within the range of 18–24 percent. Thus, for instance, with a 70/30 diene/monovinyl-substituted aromatic compound impact modifier, a final blend composition containing 18 percent diene would have a ratio of styrene polymer/impact modifier of about 74/26. With 24 percent total diene, the ratio would be about 66/34. Thus, the amount of impact modifier utilized in the preferred embodiments would range from about 24 weight percent (a 75/25 diene/monovinyl-substituted aromatic compound elastomer with the total blend having 18 percent diene) to about 40 percent (a 60/40 conjugated diene/monovinyl-substituted aromatic compound thermoplastic elastomer with a blend having 24 weight percent diene).

As can be seen from the figures, with small amounts of diene in the blend, there is a linear relationship between the melt flow and the impact strength. Similarly, with 30 percent rubber, the impact strength gradually decreases with increasing melt flow. However, between these rather narrow ranges, the impact values go through a maximum. Thus, by utilizing about 18–24 percent rubber in the blend and a melt flow within the range of 2–15, disproportionately high impact strength can be obtained.

The blends of this invention can, of course, contain conventional additives such as antioxidants, UV stabilizers, pigments, fillers, flame retardants, and the like, as is well known in the art. The percentage of diene referred to herein is meant to be the percentage by weight based on the weight of the polymeric ingredients, that is, the styrene polymer or polymers and the thermoplastic elastomer polymer or polymers exclusive of any additives.

EXAMPLE I

Linear teleblock rubbers consisting of 70/30 weight percent butadiene/styrene were prepared in a 5 gallon (0.02 m$^3$) stirred reactor in which n-butyllithium (NBL) was employed as initiator and tetrahydrofuran (THF) as a polar adjuvant. An example of the preparation of a typical linear block (styrene/butadiene/styrene) copolymer is presented for illustrative purposes. The polymerization recipe used and details thereof are given in Table I.

Table I

| | |
|---|---|
| Cyclohexane | 5806 grams |
| THF[1] | 0.62 grams (0.025 g per 100 g monomer, phm) |
| Styrene | 375 grams |
| NBL[2] | 3 grams (20.0 g of 15 weight percent solution in cyclohexane) |
| Butadiene | 584 grams |
| Butadiene | 584 grams |
| Butadiene | 583 grams |
| Styrene | 375 grams |
| Water | 6 grams (0.24 phm) |
| $CO_2$ | 0.1 phm |
| Antioxidant | 100 grams of 50 weight percent solution in cyclohexane. |

| Charge Order | Reactor Temp. °C. | Residence Time (min.) |
|---|---|---|
| Cyclohexane | 44 | — |
| THF | 44 | — |
| Styrene | 49–59 | 28 |
| NBL | 50 | — |
| Butadiene | 53–68 | 20 |
| Butadiene | 68–94 | 17 |
| Butadiene | 77–102 | 18 |
| Styrene | 89–91 | 15 |
| Water and $CO_2$[3] | 91–96 | 14 |
| Antioxidant[4] | 96 | 15 |

Notes:
[1]This amount of THF used is equivalent to 0.34 gram millimoles per 100 g of monomers (mhm).
[2]This amount of NBL used is equivalent to 1.9 mhm.
[3]This procedure is disclosed in U.S. 3,801,520 (issued to Hogan, Kitchen and Kahle on April 2, 1974), the disclosure of which is hereby incorporated by reference.
[4]Sufficient antioxidant solution is added to give 1.5 phm tris-nonylphenyl phosphite plus 0.5% tri-isopropylamine and 0.5 phm 2,6-di-t-butyl-4-methyl-phenol. This is also disclosed in said 3,801,520, Table II.

The diene is added in increments to facilitate temperature control.

Following treatment with the antioxidant solution, the reactor charge was distilled to remove about 1000 ml of the solvent and the cement was flashed at about 160° C. The recovered polymer was found to have a melt flow of 3.6 at 180° C. in accordance with ASTM D 1238-65T with a 5 kg weight.

The remaining linear block polymers were prepared as shown above except that the amount of initiator in each run was varied to obtain a product having a different melt flow as known in the art. The range of initiator in these runs varied from 0.11 to 0.14 phm (1.7–2.2 mhm). Gel permeation chromatography was used to determine the weight average and number average molecular weights of each polymer.

EXAMPLE II

Radial teleblock rubbers consisting of 70/30 weight percent butadiene/styrene were prepared using the reactor of Example I.

As before, NBL was employed as initiator and THF as polar adjuvant. The lithium-terminated rubbers were treated with a polyfunctional treating agent containing at least three functional groups per molecule to produce the branched polymers. An example of the preparation of a typical radial block copolymer with the polymerization recipe used and details thereof are given in Table II.

Table II

| | |
|---|---|
| Cyclohexane | 5806 grams |
| THF[1] | 0.62 grams (0.025 phm) |
| Styrene | 750 grams |
| NBL[2] | 6.86 grams (45.7 g of 15 weight percent solution in cyclohexane) |
| Butadiene | 584 grams |

Table II-continued

| | |
|---|---|
| Butadiene | 583 grams |
| Butadiene | 583 grams |
| Polyfunctional treating agent (SiCl$_4$)[3] | 4.5 grams (0.18 phm) |
| Water | 6 grams (0.24 phm) |
| CO$_2$ | 0.1 phm |
| Antioxidant | 100 g of 50 weight percent solution in cyclohexane |

| Charge Order | Reactor Temp. °C. | Residence Time (min.) |
|---|---|---|
| Cyclohexane | 43 | — |
| THF | 43 | — |
| Styrene | 46–66 | 31 |
| NBL | 48 | — |
| Butadiene | 59–66 | 16 |
| Butadiene | 66–91 | 18 |
| Butadiene | 65–97 | 23 |
| SiCl$_4$ | 97 | 20 |
| Water and CO$_2$[4] | 97 | 8 |
| Antioxidant[5] | 97 | 15 |

Notes:
[1] This amount of THF is equivalent to 0.34 mhm.
[2] This amount of NBL is equivalent to 4.3 mhm (0.274 phm).
[3] This amount of SiCl$_4$ is equivalent to 1.06 mhm (0.18 phm).
[4] Same basis as used in Example I.
[5] Same basis as used in Example I.

Following the treatment with the antioxidant solution, the reactor charge was distilled to remove about 1200 ml of the solvent and the cement was flashed at about 163° C. The recovered polymer was found to have a melt flow of 2.9 at 180° C. in accordance with ASTM D 1238-65T with a 5 kg weight.

The remaining copolymers in this series were prepared by varying the amounts of NBL and coupling agent as known in the art to alter the melt flows. Gel permeation chromatography was employed to determine the weight average and number average molecular weights of each polymer.

EXAMPLE III

Physical blends of each copolymer and general purpose polystyrene were made in a Banbury mixer employing about 1800 grams total polymer per batch. Each blend was subsequently extruded into strands, chopped into pellets and converted into test specimens by means of injection molding. The parts by weight NBL, coupling agent (when used), molecular weights of the rubbery copolymers prepared and melt flows thereof, composition of the physical blends, weight percent polymerized butadiene in each blend, and results obtained are given in Tables III and IV. Flexural modulus was determined in accordance with ASTM D 790-71. Tensile and elongation were determined in accordance with ASTM D 638-72 (at break, 2"/min). Izod impact was determined in accordance with ASTM D 256-56. Shore D hardness was determined in accordance with ASTM D 1706-61.

Table III

Linear Block 70/30 Butadiene/Styrene-Polystyrene Blends

| | | Rubber Details | | | | | | |
|---|---|---|---|---|---|---|---|---|
| | | Molecular Weight Rubber | | Rubber | | Blend Properties | | |
| Run No. | Initiator phm | Weight Average | Number Average | Melt Flow | Weight Percent | | Flexural Modulus | |
| | | | | | Rubber | Polystyrene | psi × 10$^{-3}$ | MPa |
| 1 | 0.11 | 87,000 | 65,000 | 1.3 | 14.3 | 85.7 | 367 | 2530 |
| 2 | 0.11 | 87,000 | 65,000 | 1.3 | 21.4 | 78.6 | 320 | 2210 |
| 3 | 0.11 | 87,000 | 65,000 | 1.3 | 28.6 | 71.4 | 275 | 1900 |
| 4 | 0.11 | 87,000 | 65,000 | 1.3 | 42.8 | 57.2 | 168 | 1160 |
| 5 | 0.12 | 79,000 | 61,000 | 3.6 | 14.3 | 85.7 | 358 | 2470 |
| 6 | 0.12 | 79,000 | 61,000 | 3.6 | 21.4 | 78.6 | 306 | 2110 |
| 7 | 0.12 | 79,000 | 61,000 | 3.6 | 28.6 | 71.4 | 245 | 1690 |
| 8 | 0.12 | 79,000 | 61,000 | 3.6 | 42.8 | 57.2 | 131 | 903 |
| 9 | 0.126 | 70,000 | 56,000 | 6.3 | 14.3 | 85.7 | 363 | 2500 |
| 10 | 0.126 | 70,000 | 56,000 | 6.3 | 21.4 | 78.6 | 277 | 1910 |
| 11 | 0.126 | 70,000 | 56,000 | 6.3 | 28.6 | 71.4 | 216 | 1490 |
| 12 | 0.126 | 70,000 | 56,000 | 6.3 | 42.8 | 57.2 | 104 | 717 |
| 13 | 0.13 | 69,000 | 55,000 | 12 | 14.3 | 85.7 | 356 | 2450 |
| 14 | 0.13 | 69,000 | 55,000 | 12 | 21.4 | 78.6 | 275 | 1900 |
| 15 | 0.13 | 69,000 | 55,000 | 12 | 28.6 | 71.4 | 187 | 1290 |
| 16 | 0.13 | 69,000 | 55,000 | 12 | 42.8 | 57.2 | 73 | 503 |
| 17 | 0.14 | 64,000 | 50,000 | 20 | 14.3 | 85.7 | 334 | 2300 |
| 18 | 0.14 | 64,000 | 50,000 | 20 | 21.4 | 78.6 | 207 | 1430 |
| 19 | 0.14 | 64,000 | 50,000 | 20 | 28.6 | 71.4 | 143 | 986 |
| 20 | 0.14 | 64,000 | 50,000 | 20 | 42.8 | 57.2 | 39 | 269 |
| 21 | — | 458,000[a] | 151,000[a] | — | 0 | 100 | 434 | |

| | Blend Properties | | | | | | |
|---|---|---|---|---|---|---|---|
| Run No. | Tensile Strength, Break | | Elongation | Shore D Hardness | Notched Izod Impact | | Weight % Polymerized Butadiene In Blend |
| | psi | MPa | % | | ft.lbs/in. | J/M | |
| 1 | 5930 | 40.9 | 31 | 78 | 0.5 | 27 | 10 |
| 2 | 5350 | 36.9 | 33 | 74 | 0.9 | 48 | 15 |
| 3 | 4740 | 32.7 | 33 | 69 | 3.8 | 210 | 20 |
| 4 | 3480 | 24.0 | 32 | 58 | 8.1 | 440 | 30 |
| 5 | 5990 | 41.3 | 21 | 78 | 0.5 | 27 | 10 |
| 6 | 5350 | 36.9 | 31 | 72 | 1.4 | 75 | 15 |
| 7 | 4740 | 32.7 | 39 | 65 | 5.8 | 320 | 20 |
| 8 | 3380 | 23.3 | 47 | 56 | 6.8 | 370 | 30 |
| 9 | 5990 | 41.3 | 24 | 78 | 0.5 | 27 | 10 |
| 10 | 5250 | 36.2 | 40 | 71 | 1.8 | 97 | 15 |
| 11 | 4490 | 31.0 | 39 | 65 | 6.2 | 330 | 20 |
| 12 | 2840 | 19.6 | 56 | 54 | 5.7 | 310 | 30 |
| 13 | 5850 | 40.3 | 32 | 78 | 0.6 | 32 | 10 |

Table III-continued
Linear Block 70/30 Butadiene/Styrene-Polystyrene Blends

| 14 | 5110 | 35.2 | 33 | 70 | 2.5 | 135 | 15 |
|----|------|------|----|----|-----|-----|----|
| 15 | 4140 | 28.5 | 41 | 63 | 5.5 | 300 | 20 |
| 16 | 3080 | 21.2 | 63 | 50 | 5.0 | 270 | 30 |
| 17 | 5740 | 39.6 | 34 | 76 | 0.9 | 48 | 10 |
| 18 | 4400 | 30.3 | 35 | 68 | 2.9 | 160 | 15 |
| 19 | 3570 | 24.6 | 35 | 62 | 3.3 | 180 | 20 |
| 20 | 1830 | 12.6 | 64 | 50 | 3.6 | 190 | 30 |
| 21 | 9170[b] | 63.2 | 9 | 85 | 0.4 | 22 | 0 |

Notes:
[a]Molecular weight of the polystyrene employed.
[b]Tensile yield value.

Table IV
Radial Block 70/30 Butadiene/Styrene-Polystyrene Blends

| | | | Rubber Details | | | | |
|---|---|---|---|---|---|---|---|
| | | Coupling | Molecular Weight Rubber | | Rubber | Blend Properties | |
| Run | Initiator | Agent | Weight | Number | Melt | Weight Percent | |
| No. | phm | phm | Average | Average | Flow | Rubber | Polystyrene |
| 22 | 0.245 | 0.163 | 145,000 | 109,000 | 0.5 | 14.3 | 85.7 |
| 23 | 0.245 | 0.163 | 145,000 | 109,000 | 0.5 | 21.4 | 78.6 |
| 24 | 0.245 | 0.163 | 145,000 | 109,000 | 0.5 | 28.6 | 71.4 |
| 25 | 0.245 | 0.163 | 145,000 | 109,000 | 0.5 | 42.8 | 57.2 |
| 26 | 0.260 | 0.172 | 117,000 | 94,000 | 1.8 | 14.3 | 85.7 |
| 27 | 0.260 | 0.172 | 117,000 | 94,000 | 1.8 | 21.4 | 78.6 |
| 28 | 0.260 | 0.172 | 117,000 | 94,000 | 1.8 | 28.6 | 71.4 |
| 29 | 0.260 | 0.172 | 117,000 | 94,000 | 1.8 | 42.8 | 57.2 |
| 30 | 0.274 | 0.181 | 120,000 | 96,000 | 2.9 | 14.3 | 85.7 |
| 31 | 0.274 | 0.181 | 120,000 | 96,000 | 2.9 | 21.4 | 78.6 |
| 32 | 0.274 | 0.181 | 120,000 | 96,000 | 2.9 | 28.6 | 71.4 |
| 33 | 0.274 | 0.181 | 120,000 | 96,000 | 2.9 | 42.8 | 57.2 |
| 34 | 0.294 | 0.196 | 122,000 | 98,000 | 5.1 | 14.3 | 85.7 |
| 35 | 0.294 | 0.196 | 122,000 | 98,000 | 5.1 | 21.4 | 78.6 |
| 36 | 0.294 | 0.196 | 122,000 | 98,000 | 5.1 | 28.6 | 71.4 |
| 37 | 0.294 | 0.196 | 122,000 | 98,000 | 5.1 | 42.8 | 57.2 |
| 38 | 0.260 | 1.0 | 82,000 | 59,000 | 7.5 | 14.3 | 85.7 |
| 39 | 0.260 | 1.0 | 82,000 | 59,000 | 7.5 | 21.4 | 78.6 |
| 40 | 0.260 | 1.0 | 82,000 | 59,000 | 7.5 | 28.6 | 71.4 |
| 41 | 0.260 | 1.0 | 82,000 | 59,000 | 7.5 | 42.8 | 57.2 |
| 42 | 0.274 | 0.5 | 64,000 | 45,000 | 17.5 | 14.3 | 85.7 |
| 43 | 0.274 | 0.5 | 64,000 | 45,000 | 17.5 | 21.4 | 78.6 |
| 44 | 0.274 | 0.5 | 64,000 | 45,000 | 17.5 | 28.6 | 71.4 |
| 45 | 0.274 | 0.5 | 64,000 | 45,000 | 17.5 | 42.8 | 57.2 |

Blend Properties

| Run | Flexural Modulus | | Tensile Strength, Break | | Elongation | Shore D |
|---|---|---|---|---|---|---|
| No. | psi × 10$^{-3}$ | MPa | psi | MPa | % | Hardness |
| 22 | 379 | 2610 | 5810 | 40.1 | 24 | 80 |
| 23 | 327 | 2250 | 5150 | 35.5 | 37 | 76 |
| 24 | 278 | 1920 | 4610 | 31.8 | 42 | 73 |
| 25 | 181 | 1250 | 3240 | 22.3 | 50 | 62 |
| 26 | 367 | 2530 | 5760 | 39.7 | 20 | 78 |
| 27 | 309 | 2130 | 5410 | 37.3 | 33 | 75 |
| 28 | 257 | 1770 | 4360 | 30.1 | 37 | 70 |
| 29 | 152 | 1050 | 2890 | 19.9 | 49 | 60 |
| 30 | 363 | 2500 | 5790 | 39.9 | 24 | 78 |
| 31 | 301 | 2080 | 5270 | 36.3 | 34 | 74 |
| 32 | 243 | 1680 | 4550 | 31.4 | 36 | 70 |
| 33 | 165 | 1140 | 3430 | 23.6 | 42 | 60 |
| 34 | 353 | 2430 | 6180 | 42.6 | 42 | 77 |
| 35 | 283 | 1950 | 5120 | 35.3 | 38 | 73 |
| 36 | 216 | 1490 | 4390 | 30.3 | 41 | 66 |
| 37 | 111 | 765 | 2770 | 19.1 | 44 | 58 |
| 38 | 360 | 2480 | 6460 | 44.5 | 62 | 77 |
| 39 | 281 | 1940 | 5230 | 36.1 | 44 | 70 |
| 40 | 200 | 1380 | 4140 | 28.5 | 39 | 65 |
| 41 | 83 | 572 | 2280 | 15.7 | 47 | 54 |
| 42 | 339 | 2340 | 5770 | 39.8 | 47 | 77 |
| 43 | 227 | 1570 | 5060 | 34.9 | 39 | 70 |
| 44 | 143 | 986 | 3730 | 25.7 | 35 | 63 |
| 45 | 53 | 365 | 1850 | 12.8 | 45 | 50 |

Table IV-continued

Radial Block 70/30 Butadiene/Styrene-Polystyrene Blends
Blend Properties

| Run No. | Notched Izod Impact ft.lbs/in. | Notched Izod Impact J/M | Weight % Polymerized Butadiene In Blend |
|---|---|---|---|
| 22 | 0.5 | 27 | 10 |
| 23 | 1.3 | 70 | 15 |
| 24 | 2.6 | 140 | 20 |
| 25 | 8.1 | 440 | 30 |
| 26 | 0.6 | 32 | 10 |
| 27 | 1.6 | 86 | 15 |
| 28 | 4.2 | 230 | 20 |
| 29 | 7.5 | 400 | 30 |
| 30 | 0.6 | 32 | 10 |
| 31 | 1.7 | 92 | 15 |
| 32 | 4.8 | 260 | 20 |
| 33 | 7.5 | 400 | 30 |
| 34 | 0.6 | 32 | 10 |
| 35 | 1.8 | 97 | 15 |
| 36 | 4.7 | 250 | 20 |
| 37 | 6.2 | 330 | 30 |
| 38 | 0.5 | 27 | 10 |
| 39 | 2.2 | 120 | 15 |
| 40 | 5.5 | 300 | 20 |
| 41 | 6.3 | 340 | 30 |
| 42 | 1.0 | 54 | 10 |
| 43 | 2.4 | 130 | 15 |
| 44 | 3.4 | 180 | 20 |
| 45 | 4.0 | 220 | 30 |

Notes:
Coupling agent in runs 22-37 was SiCl$_4$.
Coupling agent in runs 38-45 was epoxidized soybean oil (Paraplex G-62, Rohm and Haas Co.).

The unexpected nature of these results can be seen by viewing the data in Table III, for instance. A comparison of runs 1 to 4 shows that at low melt flow, there is the expected increase in impact strength with increasing polydiene content and the expected deterioration of other properties such as Shore D hardness. For instance, at 10 weight percent polydiene (14 weight percent rubber containing 70 weight percent polydiene), the material has a notched Izod impact of 0.5 ft.lbs/in. and a Shore D hardness of 78. At 20 weight percent polydiene, the notched Izod impact has increased to 3.8 ft.lbs/in. as would be expected and the hardness decreased to 69 as would be expected. Further increasing the polydiene to 30 percent gives a further increase in impact and a further decrease in hardness would be expected. Invention runs 7, 11 and 15 show impact strengths at 20 percent polydiene in the neighborhood of 6 which is about what is obtained in the 30 percent polydiene control runs (8, 12 and 16) yet the hardness is not deteriorated in the invention runs to the extent that it is with the materials having 30 percent polydiene. Control runs 17-20 again show that linear relationship between polydiene content and impact strength with the expected compromise in other properties such as hardness for runs on the other side of the melt flow range of the polymers used in the blends of the invention.

Figure 2:
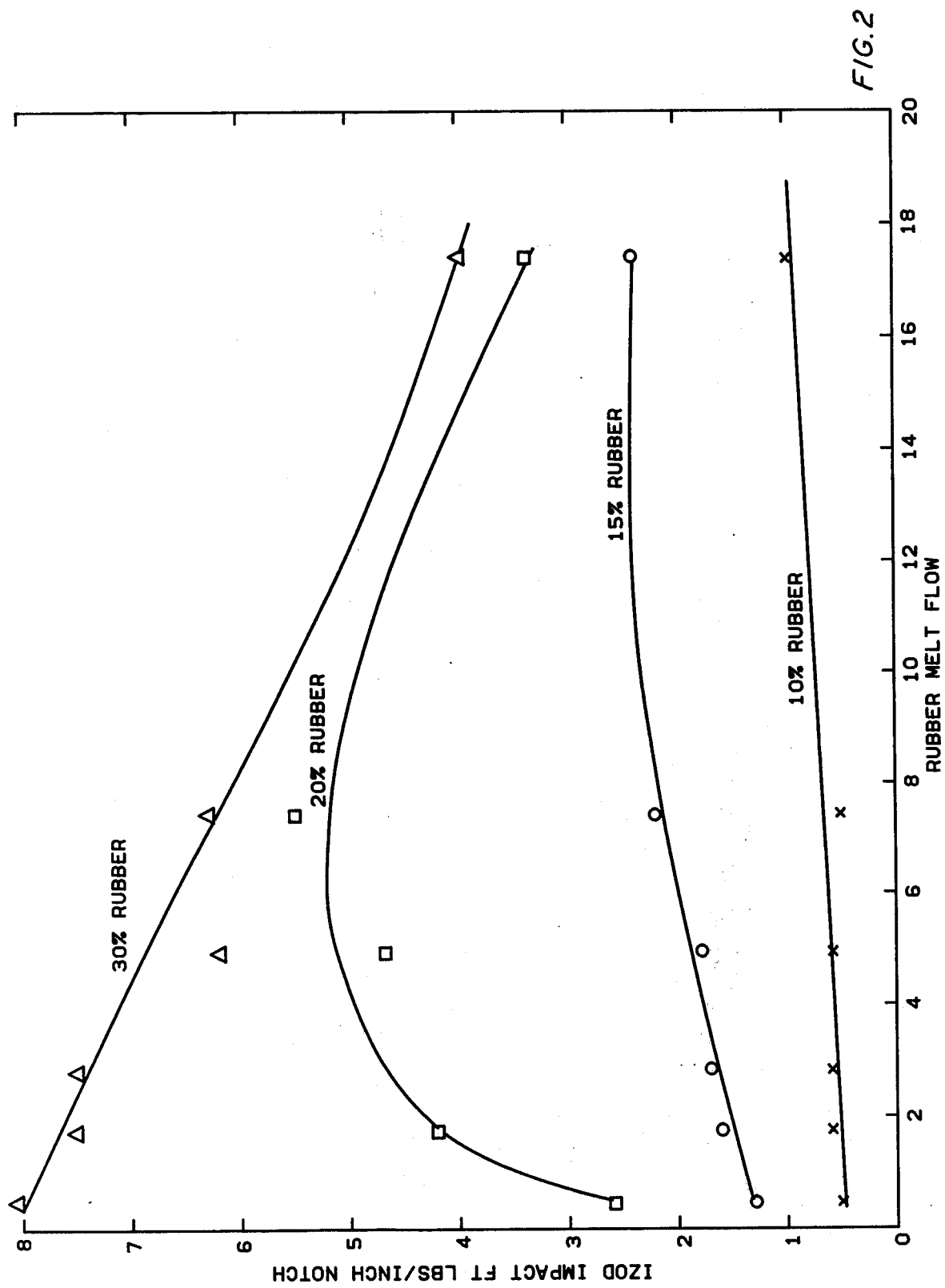

A similar, though slightly less dramatic result is shown in Table IV. For instance, control runs 24 and 44, which are below and above the melt flow range for the polymers used in the blends of the invention, exhibited notched Izod impact values of 2.6 and 3.4 ft.lbs/in. respectively at 20 weight percent polydiene whereas the invention runs 32, 36 and 40 all had notched Izod impact values of 4.7 ft.lbs/in. or greater at 20 weight percent polydiene. The unexpected nature of the results in Table IV can best be comprehended by considering the plot of the data as set out in FIG. 2.

While this invention has been described in detail for the purpose of illustration, it is not to be construed as limited thereby but is intended to cover all changes and modifications within the spirit and scope thereof.

We claim:

1. A blend having a polymerized diene content within the range of 18 to 24 weight percent based on a total weight of said blend comprising:
   a styrene polymer; and
   a thermoplastic elastomer having a melt flow within the range of 2-15 at 180° C. in accordance with ASTM D 1238-65T with a 5 kg weight, said thermoplastic elastomer being a block copolymer of at least one conjugated diene and at least one monovinyl-substituted aromatic compound.

2. A composition according to claim 1 wherein said styrene polymer is polystyrene homopolymer.

3. A composition according to claim 2 wherein said thermoplastic elastomer is a block copolymer of 1,3-butadiene and styrene.

4. A composition according to claim 3 wherein said block copolymer has a linear ABA structure.

5. A composition according to claim 3 wherein said block copolymer has a radial $(AB)_nY$ configuration where Y is a residue of a polyfunctional coupling agent or a polyfunctional initiator and n has a value of greater than 2.

6. A composition according to claim 3 wherein said blend has a polymerized diene content of about 20 weight percent.

7. A composition according to claim 1 wherein said block copolymer has a weight ratio of conjugated diene/monovinyl-substituted aromatic compound within the range of 60/40 to 75/25.

8. A composition according to claim 7 wherein said block copolymer is a block copolymer of 1,3-butadiene and styrene and said styrene polymer is polystyrene homopolymer.

9. A composition according to claim 8 wherein said block copolymer has a weight ratio of butadiene to styrene of about 70/30.

10. A composition according to claim 9 wherein said blend has a polymerized diene content of about 20 weight percent.

* * * * *